United States Patent [19]
Wollan et al.

[11] Patent Number: 5,854,939
[45] Date of Patent: Dec. 29, 1998

[54] EIGHT-BIT MICROCONTROLLER HAVING A RISC ARCHITECTURE

[75] Inventors: Vegard Wollan, Flataasen; Alf-Egil Bogen; Gaute Myklebust, both of Trondheim, all of Norway; John D. Bryant, Los Altos, Calif.

[73] Assignee: Atmel Corporation, San Jose, Calif.

[21] Appl. No.: 745,098

[22] Filed: Nov. 7, 1996

[51] Int. Cl.[6] ................................................... G06F 13/00
[52] U.S. Cl. ............................... 395/800.41; 395/800.01; 395/800.31; 395/800.32; 395/800.33
[58] Field of Search .................... 395/800.01, 800.02, 395/800.31, 800.32, 800.33, 800.41; 364/DIG. 1

[56] References Cited

U.S. PATENT DOCUMENTS

| | | | |
|---|---|---|---|
| 4,467,447 | 8/1984 | Takahashi et al. | 364/900 |
| 4,649,511 | 3/1987 | Gdula | 364/900 |
| 4,831,514 | 5/1989 | Turlakov et al. | 364/200 |
| 5,113,369 | 5/1992 | Kinoshita | 395/325 |
| 5,301,285 | 4/1994 | Hanawa et al. | 395/375 |
| 5,301,340 | 4/1994 | Cook | 395/800 |
| 5,333,284 | 7/1994 | Nugent | 395/375 |
| 5,349,693 | 9/1994 | Matsushita | 395/800 |
| 5,428,763 | 6/1995 | Lawler | 395/800 |
| 5,450,610 | 9/1995 | Watanabe et al. | 395/800 |
| 5,465,332 | 11/1995 | Deloye et al. | 395/842 |
| 5,490,256 | 2/1996 | Mooney et al. | 395/375 |
| 5,548,766 | 8/1996 | Kaneko et al. | 395/775 |
| 5,590,369 | 12/1996 | Burgess et al. | 395/800 |

OTHER PUBLICATIONS

Lin, "BIdirectional FIFO In The Processor–To–Peripheral Communication", pp. 131–136.

Hitachi H8/310 Microcontroller Architectural Overview, Sep. 1989.

Intel MCS® 51 Microcontroller Overview (no publication date).

Intel 8XC151SA/SB High–Performance CHMOS Microcontroller Product Preview, Mar. 1996.

Microchip Technology PIC16C5X Data Sheet, 1995.

Texas Instruments TMS370Cx1x 8–Bit Microcontroller Product Description, Mar. 1996.

*Primary Examiner*—Larry D. Donaghue
*Assistant Examiner*—Dzung L. Nguyen
*Attorney, Agent, or Firm*—Thomas Schneck; George B. F. Yee

[57] ABSTRACT

An eight-bit RISC based microcontroller includes an eight-bit register file having a dedicated arithmetic logic unit (ALU), in addition to a general purpose eight-bit ALU. The register file further includes means for combining a pair of registers to provide a logical sixteen-bit register for indirect addressing. The dedicated ALU is a sixteen-bit ALU which provides certain arithmetic functions for the register pair, thus alleviating the computational burdens that would otherwise be imposed on the general purpose eight-bit ALU. A further feature of the invention is the inclusion of a paging register which is combined with the contents of the logical sixteen-bit register to provide an even greater addressing range. Yet another feature of the eight-bit microcontroller of the present invention is the means for directly reading and writing to any bit position within the register file with a single instruction. This avoids having to perform various load, shift and/or masking operations needed by prior art microcontrollers.

20 Claims, 10 Drawing Sheets

EIGHT-BIT MICROCONTROLLER HAVING A RISC ARCHITECTURE

TECHNICAL FIELD

The present invention relates to microcontrollers in general, and more specifically to a microcontroller executing a reduced instruction set.

BACKGROUND ART

Present submicron CMOS technology allows for the integration of complex microcontroller architectures onto a chip, while leaving enough silicon area to implement complex memories and peripheral logic. Design architectures and methodologies most commonly used in high-end 32- and 64-bit RISC machines can be efficiently utilized and adopted in low cost 8-bit microcontroller systems. Having such powerful yet cost effective microcontrollers, the total integration level of systems continues to increase. More efficient programs can be executed in the hardware architecture, and more hardware functions can be integrated.

The RISC architecture has gained in popularity during the recent years. Most notably is the Power PC®, jointly developed by Apple Computer, IBM, and Motorola. Although there is no agreement as to the defining characteristics of RISC processors, there are common properties among the different varieties of RISC architectures: (1) most instructions execute in one cycle; (2) separate and simple load/store instructions often execute in two cycles; (3) instruction decoding is typically hardwired rather than being microcoded, resulting in faster execution times; (4) most instructions have a fixed format, thus simplifying instruction decoding; (5) smaller instruction sets and fewer addressing modes; (6) data paths are highly pipelined, providing a high degree of processing concurrency; and (7) large high-speed register sets (also known as register files) to avoid excessive data transfers to and from slower system RAM.

Several semiconductor manufacturers produce microcontrollers. Texas Instruments, for example, offers the TMS370Cx1x series of 8-bit microcontrollers. Although these microcontrollers do not employ a RISC architecture, they do provide a RAM (128 or 256 bytes) which can be used either as RAM or as a set of general purpose registers. Motorola offers the MC6805 family of 8-bit microcontrollers which employ a dual-purpose RAM similar to the Texas Instruments devices. Microchip Technology offers the PIC16C5X family of microcontrollers. These microcontrollers use the Harvard dual-bus architecture where data and program instructions have separate memories and buses. The PIC16C5X employs a register file which is shared with the system RAM. The PIC16C5X uses one level instruction pipelining; as one instruction is being executed, the next instruction is pre-fetched from program memory. Since the RAM doubles as registers, there is no real set of internal registers. Since all memory is present as a static RAM, there is a reduction in performance where register operations are involved.

As noted above, fast design cycles are an important consideration in designing with microcontrollers. There is no doubt as to the importance of the role that software plays in computer-based systems. The utility of a microcontroller design, therefore, is directly related to the specification interface between programmers and hardware designers, namely the instruction set of the microcontroller. The instruction set should be complete in the sense that any computable function should be implementable in a reasonable amount of program space. The instruction set should be efficient in that frequently used functions should be implementable with relatively few instructions.

It is therefore desirable to provide a microcontroller design which provides a complete and efficient instruction set for the applications software developer.

SUMMARY OF THE INVENTION

The present invention is a microcontroller having an 8-bit RISC architecture. An 8-bit data bus provides a data path among a RAM memory store, a register file, a general purpose eight-bit arithmetic logic unit (ALU), and a status register. The microcontroller implements the Harvard architecture, providing a program memory store separate from the RAM store and a program data bus separate from the data bus.

The register file includes a plurality of eight-bit registers. Certain of the registers in the register file can be combined to provide logical 16-bit registers. A logical 16-bit register provides efficient address calculation and is used as an indirect address pointer into data memory and program memory. Whether for data or for program memory, a 16-bit address space greatly increases the flexibility and utility of the microcontroller by increasing both the program address space and the data address space. In a preferred embodiment of the invention, the register file provides three pairs of 8-bit registers which can be accessed (i.e. read/write) as three independent logical 16-bit registers.

To further enhance the benefits of 16-bit addressing, a special second arithmetic logic unit dedicated to the register file is utilized. The second ALU contains a 16-bit adder, providing 16-bit arithmetic operations for the logical 16-bit register. The second ALU can store the 16-bit result back into the logical 16-bit register. Additionally, the 16-bit result can serve as an address. Thus, the presence of the second ALU provides efficient 16-bit address calculations without burdening the general purpose eight-bit ALU which would reduce the operating speed of the device.

A further extension of the logical 16-bit register provided in the register file is the use of an 8-bit RAM paging register. The eight bits of the RAM paging register are logically concatenated with the sixteen bits of the logical 16-bit register to provide a logical 24-bit address. This feature offers an unprecedented range of addressing for a microcontroller whose underlying architecture is fundamentally an eight-bit design. In particular, the paging register organizes memory as 256 pages of 64K (64 * 1024) bytes of RAM, each 64K page being referenced by the paging register. In a preferred embodiment of the invention there are three paging registers, one for each of the three logical 16-bit registers provided by the register file.

A bit store allows for the transfer of a one bit datum to and from an arbitrary bit position among the registers of the register file. In a preferred embodiment, the bit store is located in the status register. This bit transfer feature allows for the direct manipulation of register bit positions without having to perform numerous and otherwise time-consuming register shift operations. As is typical in many microcontroller applications, the individual bits comprising a one-byte datum have significance independent of the other bits. The instruction set of a prior art microcontroller typically includes shift instructions to provide left- and right-shifting of a register. Thus, access to a bit in a given bit position of a register is achieved by shifting the bit, either to the right or to the left. This is a destructive operation, requiring that the register contents be saved if the original data is to be preserved. In addition, the operation is time consuming and requires a number of program instructions to implement. The bit transfer operations of the present invention offer a more time efficient and less space consuming means for accessing arbitrary bit positions.

A compare-with-carry instruction provides 16-bit enhancement of the eight-bit registers comprising the register file. This feature of the instruction set provides an efficient method for implementing comparisons of 16-bit quantities in an eight-bit environment, thus further enhancing the utility of the eight-bit microcontroller of the present invention.

BEST MODE OF CARRYING OUT THE INVENTION

Figure 1:
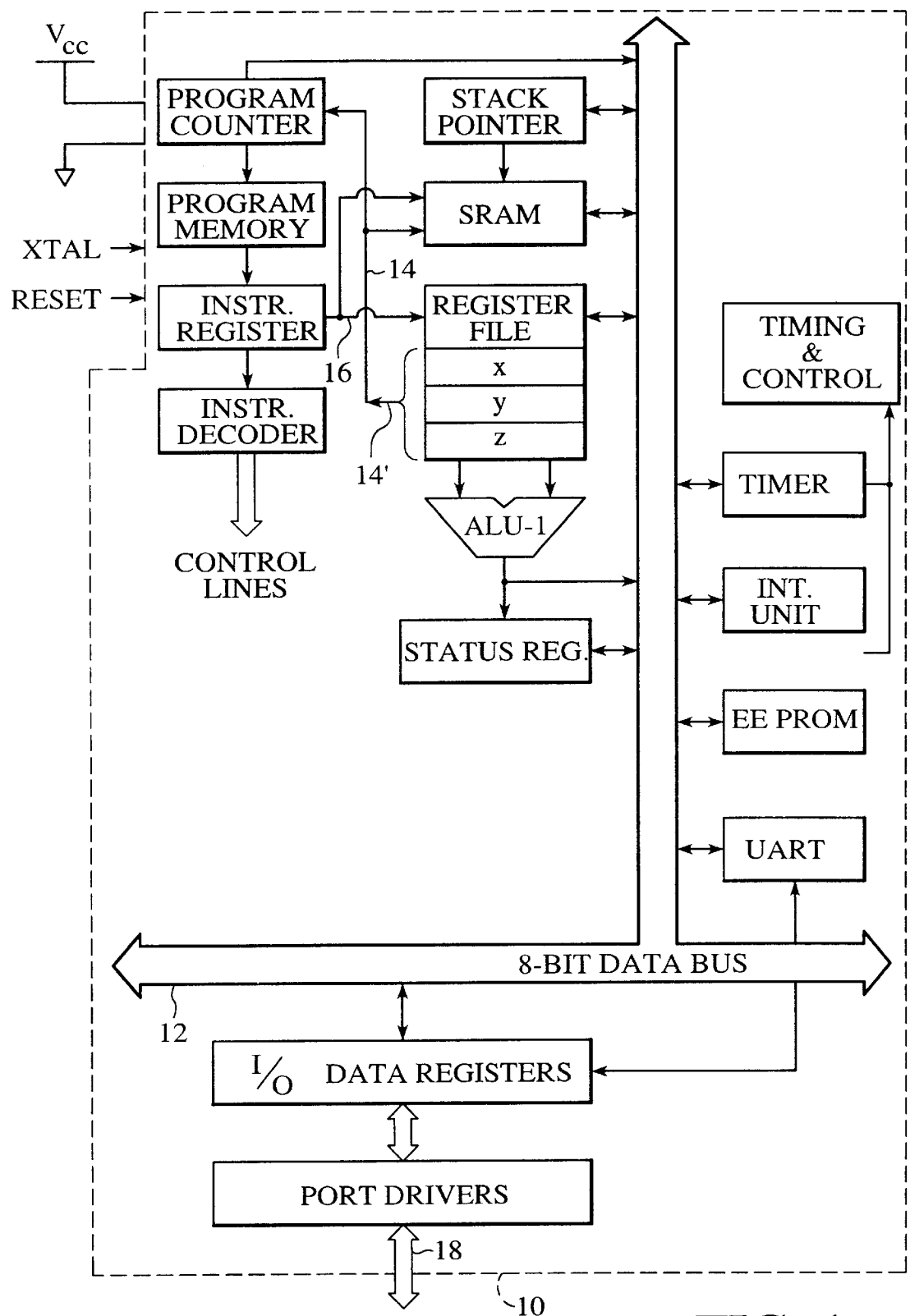
FIG. 1 shows a schematic layout of the microcontroller of the present invention.

With reference to FIG. 1, the microcontroller 10 of the present invention is designed around an eight bit data bus 12 structure. The data bus provides a data path for the various components comprising the microcontroller. An on-board SRAM serves as a general data store. An eight bit REGISTER FILE, separate from the SRAM, provides a set of high speed eight bit memory stores for the microcontroller.

A general purpose arithmetic and logic unit ALU-1 is coupled to the REGISTER FILE to provide arithmetic computations for data stored in the registers. The output of ALU-1 is coupled to both the eight bit data bus 12 and to a STATUS REGISTER. Various status bits comprising the STATUS REGISTER are set according to the results of ALU-1. Typical bits contained in the STATUS REGISTER include, but are not limited to: a carry flag; a zero flag; a negative flag; a two's complement overflow indicator; a sign bit, equal to the exclusive-OR between the negative flag and the two's complement overflow flag; and an interrupt enable bit. The STATUS REGISTER is coupled to the data bus 12 to allow read/write access to the status bits. Additional components coupled to the data bus 12 include: a STACK POINTER used for subroutine calls/returns and for interrupt handling; a timer; an interrupt circuit; timing and control circuitry; an EEPROM; and a UART. I/O DATA REGISTERS driven by PORT DRIVERS provide an I/O path 18 for the microcontroller.

A direct-address bus 16 provides direct access to the SRAM locations and to the REGISTER FILE during program execution. An indirect-address bus 14 provides indirect addressing. The indirect-address bus 14 includes a means for receiving an address from the REGISTER FILE, namely the bus interface 14' which couples the REGISTER FILE to the indirect-address bus 14 for transmitting an address either to the SRAM or to a PROGRAM COUNTER.

The instruction execution components of the microcontroller 10 include a PROGRAM COUNTER which is coupled to a PROGRAM MEMORY. A program instruction specified by the PROGRAM COUNTER is fetched from the PROGRAM MEMORY and fed into an INSTRUCTION REGISTER. From the INSTRUCTION REGISTER, the program instruction is decoded by an INSTRUCTION DECODER which generates various control signals. The control signals are carried by CONTROL LINES to the other components of the microcontroller 10 to perform operations in accordance with decoded program instructions. The buses coupling the instruction execution components are collectively referred to as the program bus. The arrangement of a program memory store that is separate from the data store and the use of a program bus that is separate from the data bus 12 is commonly referred to as the Harvard architecture.

As noted above, the REGISTER FILE consists of a plurality of eight bit registers. In a preferred embodiment of the invention, there are thirty-two eight bit registers. It is pointed out, however, that the microcontroller will operate equally well with more or fewer registers in the REGISTER FILE. The general purpose arithmetic and logic unit ALU-1 is an eight bit operator, providing eight bit arithmetic operations between registers selected from the REGISTER FILE. The output of ALU-1 can be fed back to a register in the REGISTER FILE via the data bus 12. As will be discussed in greater detail below, some of the eight bit registers can be combined in pairs to provide logical sixteen bit registers. In the preferred embodiment, three pairs of eight bit registers provide three logical sixteen bit registers X, Y, Z, as shown in FIG. 1.

Figure 2A:
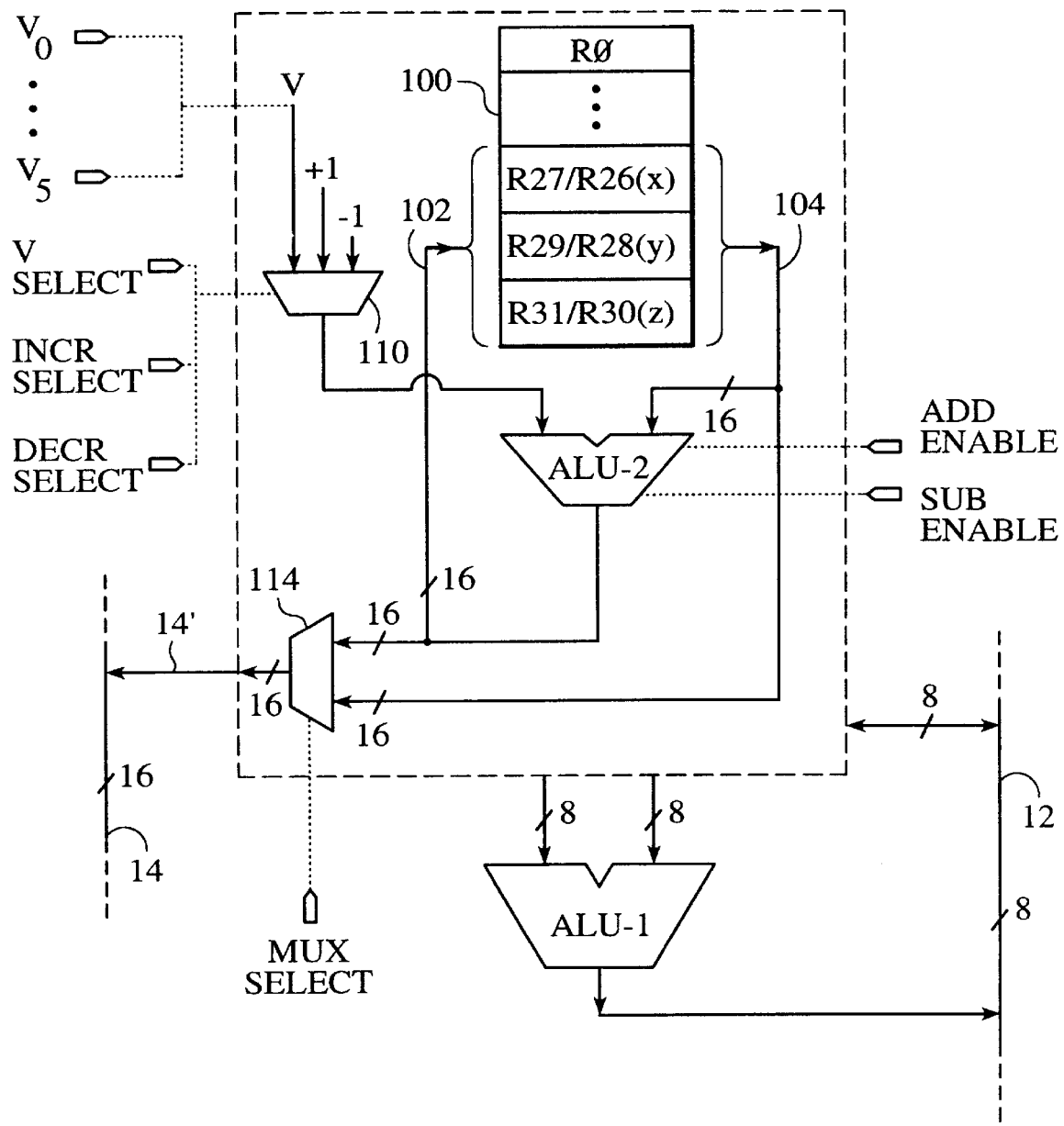
FIGS. 2A–2C depict an internal representation of the register file used in the microcontroller of FIG. 1.

Turning to FIG. 2A, the REGISTER FILE of the present invention includes register circuitry 100 which provides thirty-two eight bit registers R0–R31. As will be described below, the register circuitry 100 is capable of provisioning the last six registers R26–R31 as three pairs of logical sixteen bit registers R27/R26 (X), R29/R28 (Y), R31/R30 (Z). A common bus interface consisting of two sixteen-line data buses 102, 104 provide respectively a data-in and a data-out bus for the registers.

The sixteen bit registers provided by the REGISTER FILE are used as indirect address register pointers for SRAM and program-space addressing. As such, certain sixteen bit arithmetic operations, such as post-increment and pre-decrement, are needed for address calculations. Although it is possible to use ALU-1 to provide sixteen bit arithmetic for the sixteen bit registers, such operations would be quite inefficient because of the eight bit design of ALU-1.

The REGISTER FILE shown in FIG. 2A therefore includes a second arithmetic and logic unit ALU-2 dedicated to the REGISTER FILE to facilitate sixteen bit computations involving the logical sixteen bit registers. The arithmetic and logic unit ALU-2 is a sixteen bit design, customized to provide specific operations typically required of indirect address pointers. The ALU-2 has a first input which is fed by the data-out bus 104 of the REGISTER FILE. The ALU-2 has a second input which is fed by a selector 110. The selector 110 selects a numeric value from among three choices: a numeric value of −1, a numeric value of +1, and a constant V. The output of ALU-2 feeds back to the X, Y, Z registers on the data-in bus 102, allowing for the contents of the registers to be updated. A mux 114 is coupled to the bus interface 14' of the REGISTER FILE. One input of the mux 114 is coupled to the output of the ALU-2, while a second input of the mux is coupled to the data-out bus 104. This arrangement allows the mux 114 to selectively output data either from ALU-2 or from the register circuitry 100.

The following control signals are pertinent to the operation of the discussed features of the REGISTER FILE. They include: ADD ENABLE, SUB ENABLE, MUX SELECT, V SELECT, $V_5$–$V_0$, INCR SELECT, and DECR SELECT. These signals are carried by various CONTROL LINES originating from the INSTRUCTION DECODER. Operation of the REGISTER FILE in terms of these control signals will be discussed below with reference to the program instructions of the microcontroller of the present invention.

Figure 3A:
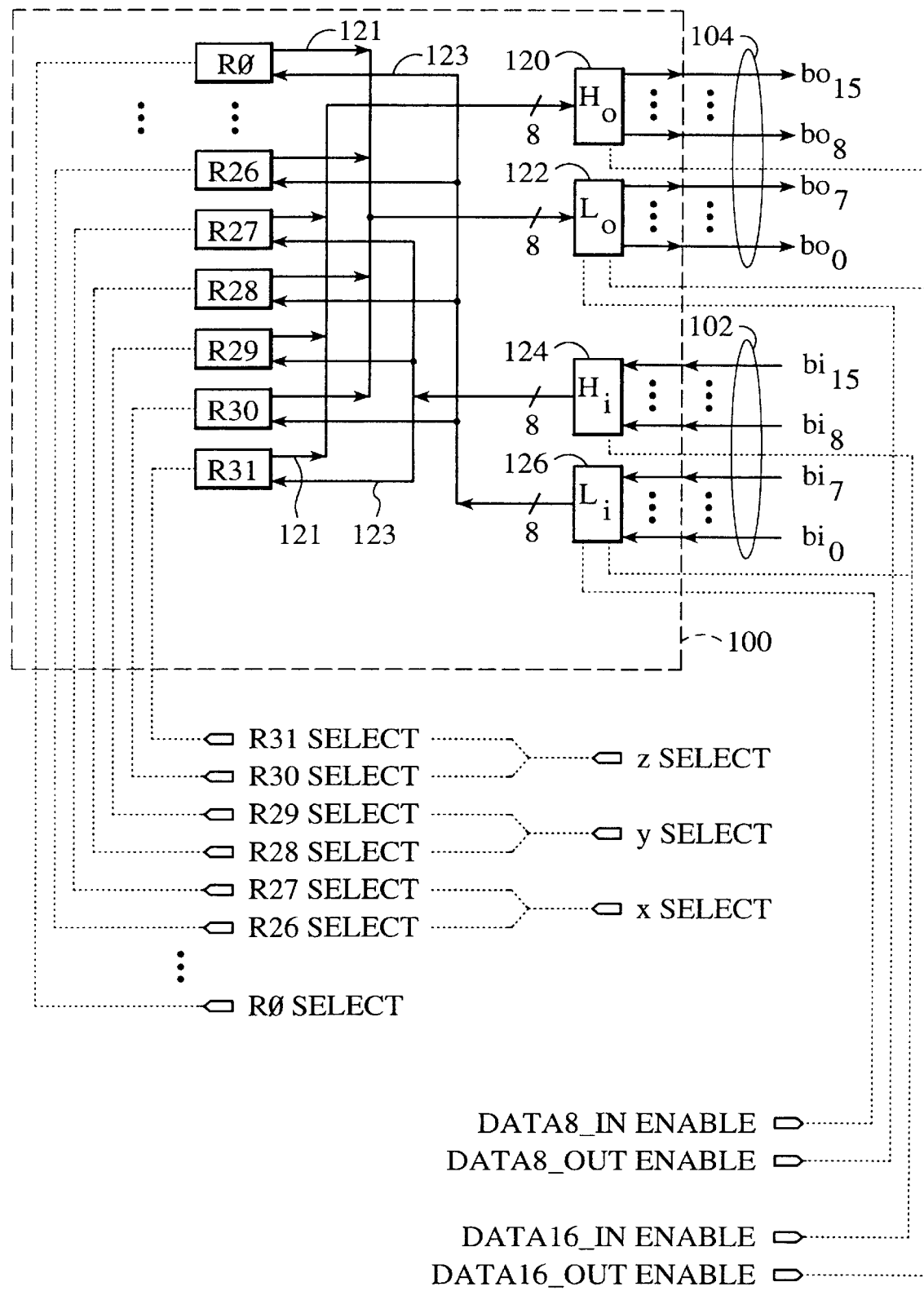
FIGS. 3A and 3B illustrate the organization of the registers in the register file shown in FIGS. 2A–2C.

The internal organization of the register circuitry 100 illustrated in FIG. 2A is shown in the block diagram of FIG. 3A. In one embodiment of the invention, thirty-two registers R0–R31 are provided, each having a set of eight bit output lines 121 and a set of eight bit input lines 123. The actual number of registers provided is not critical to the invention. A set of latches 120–126 is coupled to selectively latch data into and out of the registers. These latches provide the input and output data bits $bi_{15} \ldots bi_0$, $bo_{15} \ldots bo_0$ of the common bus interface 102, 104 shown in FIG. 2A. Data transfer between the eight bit registers R0–R31 is provided through the data-in latch 122 and the data-out latch 126, as bits $bi_7$–$bi_0$ and $bo_7$–$bo_0$ respectively.

For the logical sixteen bit registers X, Y, Z, additional data-in and data-out latches 120, 124 are provided. The X register consists of the register pair R27:R26, the Y register consists of the register pair R29:R28, and the Z register consists of the register pair R31:R30. The data-out latches 120, 122 latch the contents of one of the sixteen bit registers onto the output bits $bo_{15}$–$bo_0$ of the common bus interface 102, 104, while the data-in latches 124, 126 latch in data appearing on the input bits $bi_{15}$–$bi_0$. The data-out latch 120 is coupled to the output lines 121 of the hi-byte registers R27, R29, and R31. Similarly, the data-out latch 122 is coupled to the output lines 121 of the lo-byte registers R26, R28, and R30. The data-in latches 124, 126 are coupled in the same manner, namely the data-in latch 124 is coupled to the input lines 123 of the hi-byte registers R27, R29, and R31 while the data-in latch 126 is coupled to the input lines 123 of the lo-byte registers R26, R28, and R30.

The following control signals are pertinent to the operation of the discussed features of the register circuitry 100. They include: DATA16_IN, DATA16_OUT, DATA8_IN, DATA8_OUT, R0 SELECT–R31 SELECT, X SELECT, Y SELECT, and Z SELECT. Operation of the register circuitry 100 in terms of these control signals will be discussed below with reference to the program instructions of the microcontroller of the present invention.

The discussion will now turn to another feature of the eight bit microcontroller of the present invention. Recall from the discussion above, that prior art techniques for loading or storing an arbitrary bit position of a register requires register shift and/or register masking operations, resulting in less efficient code and increased code size. In addition, this is a destructive operation, requiring that the register contents be saved if the original data is to be preserved.

Figure 4A:
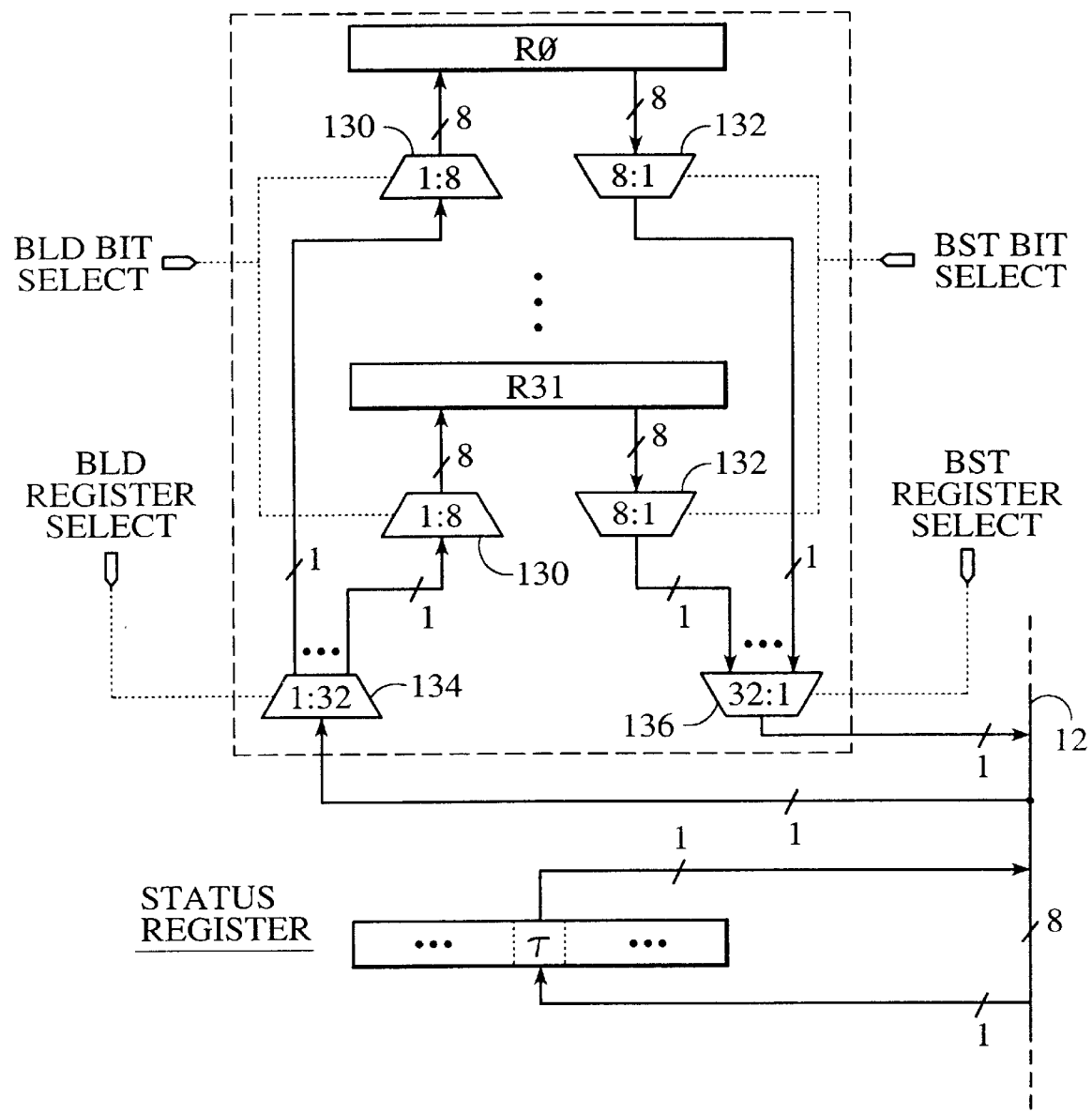
FIGS. 4a and 4B show the bit store mechanism of the present invention.

Refer to FIG. 4A for another view of the internal organization of the REGISTER FILE of the present invention, detailing additional components in the REGISTER FILE which provide arbitrary access to a bit from among the registers R0–R31. Logically, each register has a 1:8 multiplexer 130 wherein each of the eight outputs of the multiplexer is coupled to a bit in the register. Thus, a bit can be loaded into any bit position in the register by latching the bit into the one-bit input of the mux 130 and transferring the mux input to one of its eight outputs. Each register further has an 8:1 mux 132 wherein each of its eight inputs is coupled to a bit in the register. Any bit position in the register can therefore be copied out by selecting the mux input corresponding to the bit of interest.

Continuing, the REGISTER FILE logically includes a 1:32 mux 134 and a 32:1 mux 136. Consider first the 1:32 mux 134. This mux has a one bit input taken from the eight-bit data bus 12. The input can be transferred to any one of its thirty-two outputs. Each of the thirty-two outputs, in turn, is coupled to the input of one of the 1:8 mux's 130, thus providing a path from the data bus 12 to any bit position in any of the registers R0–R31 in the REGISTER FILE. Consider next the 1:32 mux 136. The output of each of the 8:1 mux's 132 is coupled to one of the thirty-two inputs of the mux 136. The one bit output of the mux 136, in turn, is coupled to the data bus 12, thus providing a data path from any bit position in any of the registers R0–R31 to the data bus.

The STATUS REGISTER shown in FIG. 4A includes a bit position for receiving and holding a one bit datum, known as the T-bit for transfer bit. The STATUS REGISTER is coupled to the eight bit data bus 12 to provide read/write access to its various bits. In particular, the T-bit position is controlled in conjunction with the 1:32 mux 134 and the 32:1 mux 136 either to receive a one bit datum from the 32:1 mux 136 over the data bus or to transfer a one bit datum to the 1:32 mux 134 over the data bus.

The following control signals are pertinent to the operation of the features of the REGISTER FILE shown in FIG. 4A. They include: BST REGISTER SELECT, BST BIT SELECT, BLD REGISTER SELECT, and BLD BIT SELECT. Operation of the REGISTER FILE in terms of these control signals will be discussed below with reference to the program instructions of the microcontroller of the present invention.

Figure 5:
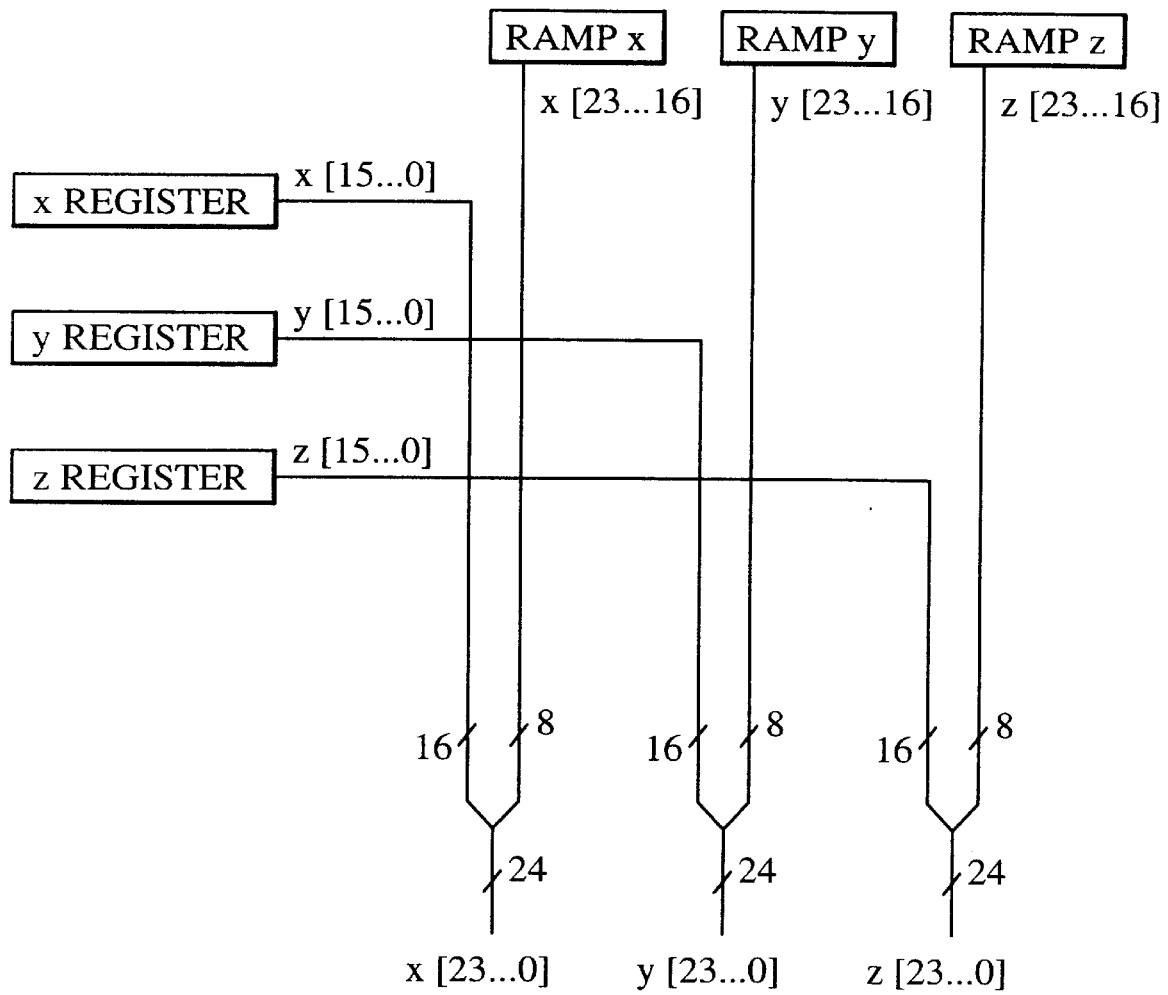
FIG. 5 illustrates the formation of a 24-bit logical address using paging registers in accordance with the present invention.

Another feature of the eight bit microcontroller of the present invention is an enhanced addressing capability as shown in FIG. 5. Shown are three additional registers external to the REGISTER FILE, namely the RAM paging registers RAMPX, RAMPY, RAMPZ. The RAM paging registers operate in conjunction with their corresponding logical sixteen bit registers X, Y, Z to provide a greatly increased addressing range as compared to prior art eight bit microcontrollers. In the disclosed embodiment, the RAM paging registers are eight bit registers. However, this is not critical, and it will become clear that the invention can easily work with registers having a different bit length.

Referring to FIG. 5, a schematic representation of how the address is built up is shown. Each of the RAM paging registers is concatenated with its corresponding sixteen bit register. For example, the eight bits of the RAM paging register RAMPX are concatenated with the sixteen bits of the X register, to form a twenty-four bit address. In the preferred embodiment, the eight bits of RAMPX serve as the high order bits X[23 . . . 16] of the twenty-four bit logical address, while the sixteen bits of the X register provide the low order bits X[15 . . . 0] of the twenty-four bit logical address. The memory model created by this arrangement is a set of 64K byte (64 * 1024) pages, each 64K page being accessed by an eight bit RAM paging register for a total of 256 pages.

Figure 6:
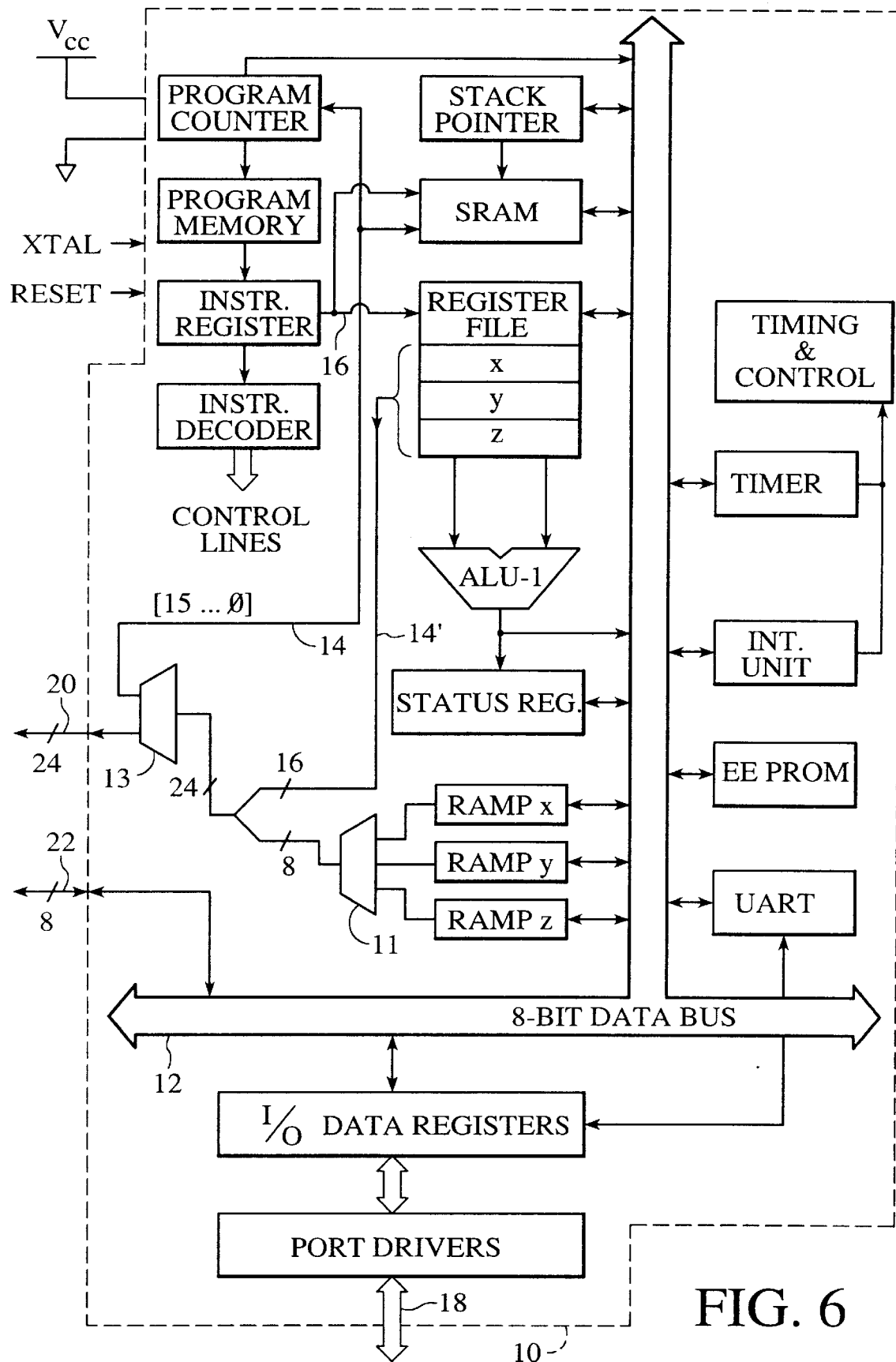
FIG. 6 depicts a diagram of the microcontroller of FIG. 1, incorporating the paging registers shown in FIG. 5.

Turn now to FIG. 6 for a description of an embodiment of the RAM paging registers in the context of the disclosed embodiments of the invention. Each of the RAM paging registers RAMPX, RAMPY, RAMPZ is coupled to the eight bit data bus 12, to receive an eight bit page reference during program execution. A selector 11 (for example, a 3:1 multiplexer) receives the eight bits from each of the RAM paging registers and transfers the eight bits of a selected one of the RAM paging registers to the output of the selector. The sixteen bits of the bus interface 14' of the REGISTER FILE are concatenated with the eight bits from the selector 11 to form a twenty-four bit address which is carried by the indirect-address bus 14.

The extended twenty-four bit addressing of the invention allows for the use of externally provided RAM (not shown), since a twenty-four bit address is capable of addressing 16M (16 * 1024 * 1024) of RAM. An external twenty-four bit address bus 20 and an eight bit data bus 22 are included for data access between the microcontroller and an external RAM (not shown). In accordance with the present invention, the REGISTER FILE, the on-board SRAM, and the external RAM occupy the same data address space. The REGISTER FILE occupies the first 32 address locations and the on-board SRAM occupies the next N address locations, N being the size of the SRAM. The remainder of the address space is provided by external RAM. Thus, the address range 00 to (N−1) maps to memory locations of the on-board memory (REGISTER FILE and SRAM), while the remaining address range N to (16M−1) maps to memory locations in the external RAM. For example, if the on-board memory has a total of 64K bytes, then the on-board address range is $00 to $FFFF ("$" signifies hexadecimal notation), while the address range of the external RAM is $10000 to $FFFFFF. It is noted that the amount of on-board memory can be varied without affecting the utility or operability of the present invention, the actual amount memory depending upon design criteria such as available silicon area, device geometries, and design rules.

In order to ensure that the on-board memory and the external RAM are correctly accessed for a given address, a second selector 13 is used to transfer the address either to the internal address bus 14 or to the external address bus 20. In a preferred embodiment, the selector 13 is a 1:2 mux wherein the single MUX input is transferred to one of its two outputs. Here, the single input is the twenty-four bit address line coming out of the selector 11. One of the outputs of the selector 13 is coupled to the address bus 14, while the other output is coupled to the external address bus 20. Upon detecting an address within the address range of the on-board memory, the selector 13 is caused to transfer its input to the address bus 14. Observe that only the low order 16 bits [15 . . . 0] of the twenty-four bit address are transferred to the address bus 14. Conversely, selector 13 will transfer its input to the external address bus 20 upon detection of an address within the address range of the external memory. Any of a number of detection schemes is possible, all being within the ability of a designer of ordinary skill. For example, one may OR together the high order eight bits (bits [23 . . . 0]) of the twenty-four bit address, using the result to control the selector 13. If the OR operation results in FALSE, meaning that the address falls within the address range of the on-board memory, then the selector 13 should transfer its input to the internal address bus 14. If the OR operation results in TRUE, meaning that the address is a full twenty-four bit address, then the selector 13 should transfer its input to the external address bus 20.

Having described the hardware details pertinent to the features of the eight bit microcontroller of the present invention, the discussion will now turn to the instruction set of the microcontroller. Firstly, the present microcontroller supports program instructions typical of all microcontrollers, including arithmetic and logic instructions, branch instructions, data transfer instructions, and bit test and bit set instructions. Additionally, the present microcontroller provides instructions which are enabled by the circuitry described above and illustrated in the figures. Following is a summary of these instructions:

ADIW
    Description:  Add a constant to a logical 16 bit register L (X[R27:R26], Y[R29:R28], or Z[R31:R30]).
                            Memory access is limited to the RAM page specified in the corresponding RAM paging register RAMPX, RAMPY, and RAMPZ.
    Operation:    L ← L + K
    Syntax:       ADIW L, K
                  where:          L is one of X, Y, and Z; and
                                    K is a constant, 0 ≤ K ≤ 63
    Example:
                adiw X, 1         ; add 1 to the X register
                adiw Z, 63       ; add 63 to the Z register BST
    Description:  Store a bit from a register into the T-bit.
    Operation:    T-bit ← Rd(b)
    Syntax:       BST Rd, b
                  where:          Rd is a register, R0 . . . R31; and
                                    b is the bit position, 0 ≤ b ≤ 7
    Example:
                                    ; copy bit
                bst r4, 3          ; store bit 3 of r4 into T-bit
                bld r21, 6        ; load bit 6 of r21 from T-bit BLD
    Description:  Load a bit from the T-bit into a register.
    Operation:    Rd(b) ← T-bit
    Syntax:       BLD Rd, b
                  where:          Rd is a register, R0 . . . R31; and
                                    b is the bit position, 0 ≤ b ≤ 7
    Example:
                                    ; copy bit
                bst r4, 3          ; store bit 3 of r4 into T-bit
                bld r21, 6        load bit 6 of r21 from T-bit CPC
    Description:  Perform a compare between two registers,

|  |  | taking into account the previous carry. |  |
|---|---|---|---|
|  | Operation: | Rd – Rr – C |  |
|  |  | where: | Rd, Rr are registers, R0 ... R31; and C is the carry bit; |
|  | Syntax: | CPC Rd, Rr |  |
|  | Example: |  |  |
|  |  |  | ; compare r3:r2 with r1:r0 |
|  |  | cp r2, r0 | ; compare low byte |
|  |  | cpc r3, r1 | ; compare high byte |
|  |  | brne noteq | ; branch if not equal |
|  |  | . |  |
|  |  | . |  |
|  |  | . |  |
|  | noteq: | ... | branch destination |
|  |  | nop | ; (do nothing) |
| IJMP |  |  |  |
|  | Description: | Indirect jump to the address pointed to by the logical 16 bit Z register, Z[R31:R30]. |  |
|  | Operation: | PC[15 ... 0] ← Z[15 ... 0] |  |
|  | Syntax: | IJMP (no operands) |  |
|  | Example: |  |  |
|  |  |  | ; initialize jump address |
|  |  | mov r30, r0 | ; copy r0 into r30 |
|  |  | mov r31, r1 | ; copy r1 into r31 |
|  |  | ijmp | ; jump to instruction pointed |
|  |  |  | ; to by r31:r30 |
| ICALL |  |  |  |
|  | Description: | Indirect call of a subroutine pointed to by the logical 16 bit Z register, Z[R31:R30]. |  |
|  | Operation: | STACK ← PC + 1 |  |
|  |  | SP ← SP – 2 |  |
|  |  | PC[15 ... 0] ← Z[15 ... 0] |  |
|  | syntax: | ICALL (no operands) |  |
|  | Example: |  |  |
|  |  |  | ; initialize subroutine address |
|  |  | mov r30, r0 | ; copy r0 into r30 |
|  |  | mov r31, r1 | ; copy r1 into r31 |
|  |  | icall | ; jump to instruction pointed |
|  |  |  | ; to by r31:r30 |
| LD |  |  |  |
|  | Description: | Load one byte indirect from a memory location to a register, the memory location being pointed to by a logical 16 bit register L (X[R27:R26], Y[R29:R28], or Z[R31:R30]). The logical register may be post-incremented or pre-decremented. Memory access is limited to the RAM page specified in the corresponding RAM paging register RAMPX, RAMPY, and RAMPZ. |  |
|  | Operation: | 1: Rd ← (L) | L: unchanged, OR |
|  |  | 2: Rd ← (L) |  |
|  |  | L ← L + 1 | L: post-incremented, OR |
|  |  | 3: L ← L – 1 |  |
|  |  | Rd ← (L) | L: pre-decremented |
|  | Syntax: | LD Rd, L | L: unchanged |
|  |  | LD Rd, L+ | L: post-incremented |
|  |  | LD Rd, –L | L: pre-decremented |
|  |  | where: | Rd is a register, R0 ... R31: and L is one of X, Y, and Z |
|  | Example: |  |  |
|  |  | clr r27 | ; clear X high byte |
|  |  | ldi r26, $20 | ; set X low byte to $20 |
|  |  | ld r0, X+ | ; load r0 with contents of |
|  |  |  | ; memory location $20 |
|  |  |  | ; (X post-incremented) |
|  |  | ld r1, X | ; load r1 with contents of |
|  |  |  | ; memory location $21 |
|  |  |  | ; (X unchanged) |
|  |  | ld r2, –X | ; load r2 with contents of |
|  |  |  | ; memory location $20 |
|  |  |  | ; (X pre-decremented) |
| LDD |  |  |  |
|  | Description: | Load one byte indirect, with displacement, from a memory location to a register, the memory location being pointed to by a logical 16 bit register L (Y[R29:R28], or Z[R31:R30]) and offset by a displacement value. Memory access is limited to the RAM page specified in the corresponding RAM paging register RAMPY, and RAMPZ. |  |
|  | Operation: | Rd ← (L + q) |  |

|      | Syntax:       | LDD Rd, L + q |                                                                                                                                                                                                                                                                              |
| ---- | ------------- | ------------- | ---------------------------------------------------------------------------------------------------------------------------------------------------------------------------------------------------------------------------------------------------------------------------- |
|      |               | where:        | Rd is a register, R0 . . . R31; <br> L is one of Y and Z; and <br> q is a displacement, $0 \leq q \leq 63$                                                                                                                                                                   |
|      | Example:      |               |                                                                                                                                                                                                                                                                              |
|      |               | clr r29       | ; clear Y high byte                                                                                                                                                                                                                                                          |
|      |               | ldi r28, $20  | ; set Y low byte to $20                                                                                                                                                                                                                                                      |
|      |               | ldd r4, Y + 2 | ; load r4 with contents <br> ; of memory location $22                                                                                                                                                                                                                        |
| SBIW |               |               |                                                                                                                                                                                                                                                                              |
|      | Description:  |               | Subtract a constant from a logical 16 bit register <br> L (X[R27:R26], Y[R29:R28], or Z[R31:R30]). <br> Memory access is limited to the RAM page specified <br> in the corresponding RAM paging register RAMPX, <br> RAMPY, and RAMPZ.                                       |
|      | Operation:    | L ← L − K     |                                                                                                                                                                                                                                                                              |
|      | Syntaxt       | SBIW L, K     |                                                                                                                                                                                                                                                                              |
|      |               | where:        | L is one of X, Y, and Z; and <br> K is a constant, $0 \leq K \leq 63$                                                                                                                                                                                                        |
|      | Example:      |               |                                                                                                                                                                                                                                                                              |
|      |               | sbiw X, 1     | ; subtract 1 from the <br> ; X register                                                                                                                                                                                                                                      |
|      |               | sbiw Z, 63    | , subtract 63 from the <br> ; Z register                                                                                                                                                                                                                                     |
| ST   |               |               |                                                                                                                                                                                                                                                                              |
|      | Description:  |               | Store one byte indirect from a register to a <br> memory location, the memory location being pointed <br> to by a logical 16 bit register L (X[R27:R26], <br> Y[R29:R28], or Z[R31:R30]). The logical <br> register may be post-incremented or <br> pre-decremented. Memory access is limited to the <br> RAM page specified in the corresponding RAM paging <br> register RAMPX, RAMPY, and RAMPZ. |
|      | Operation:    | 1: (L) ← Rd   | L: unchanged, OR                                                                                                                                                                                                                                                             |
|      |               | 2: (L) ← Rd   |                                                                                                                                                                                                                                                                              |
|      |               | L ← L + 1     | L: post-incremented, OR                                                                                                                                                                                                                                                      |
|      |               | 3: L ← L − 1  |                                                                                                                                                                                                                                                                              |
|      |               | (L) ← Rd      | L: pre-decremented                                                                                                                                                                                                                                                           |
|      | Syntax:       | ST L, Rd      | L: unchanged                                                                                                                                                                                                                                                                 |
|      |               | ST L+, Rd     | L: post-incremented                                                                                                                                                                                                                                                          |
|      |               | ST −L, Rd     | L: pre-decremented                                                                                                                                                                                                                                                           |
|      |               | where:        | L is one of X, Y, and Z; and <br> Rd is a register, R0 . . . R31                                                                                                                                                                                                             |
|      | Example:      |               |                                                                                                                                                                                                                                                                              |
|      |               | clr r27       | ; clear X high byte                                                                                                                                                                                                                                                          |
|      |               | ldi r26, $20  | ; set X low byte to $20                                                                                                                                                                                                                                                      |
|      |               | st X+, r0     | ; store contents of r0 into <br> ; memory location $20 <br> ; (X post-incremented)                                                                                                                                                                                           |
|      |               | st X, r1      | ; store contents of r1 into <br> ; memory location $21 <br> ; (X unchanged)                                                                                                                                                                                                  |
|      |               | ldi r26, $23  | , set X low byte to $23                                                                                                                                                                                                                                                      |
|      |               | st −X, r2     | ; stare contents of r2 into <br> ; memory location $22 <br> ; (X pre-decremented)                                                                                                                                                                                            |
| STD  |               |               |                                                                                                                                                                                                                                                                              |
|      | Description:  |               | Store one byte indirect, with displacement, from a <br> register to a memory location, the memory location <br> being painted to by a logical 16 bit register L <br> (Y[R29:R28], or Z[R31:r30]) and offset by a <br> displacement value. Memory access is <br> limited to the RAM page specified in the <br> corresponding RAM paging register RAMPY, and RAMPZ. |
|      | Operation:    | (L + q) ← Rd  |                                                                                                                                                                                                                                                                              |
|      | Syntax:       | LDD L + q, Rd |                                                                                                                                                                                                                                                                              |
|      |               | where:        | L is one of Y and Z; <br> q is a displacement, $0 \leq q \leq 63$; <br> and <br> Rd is a register, R0 . . . R31                                                                                                                                                              |
|      | Example:      |               |                                                                                                                                                                                                                                                                              |
|      |               | clr r29       | ; clear Y high byte                                                                                                                                                                                                                                                          |
|      |               | ldi r28, $20  | ; set Y low byte to $20                                                                                                                                                                                                                                                      |
|      |               | std Y + 2, r4 | ; store contents of r4 into <br> ; memory location $22                                                                                                                                                                                                                       |

Recall in FIG. 1 that the INSTRUCTION DECODER produces control signals which are carried by the CONTROL LINES to the various components of the microcontroller to effectuate the operations needed to perform the decoded instructions. The discussion will now focus on the control signals associated with the above-described instructions in relation to their effect on the circuitry described in the above figures.

Figure 4B:
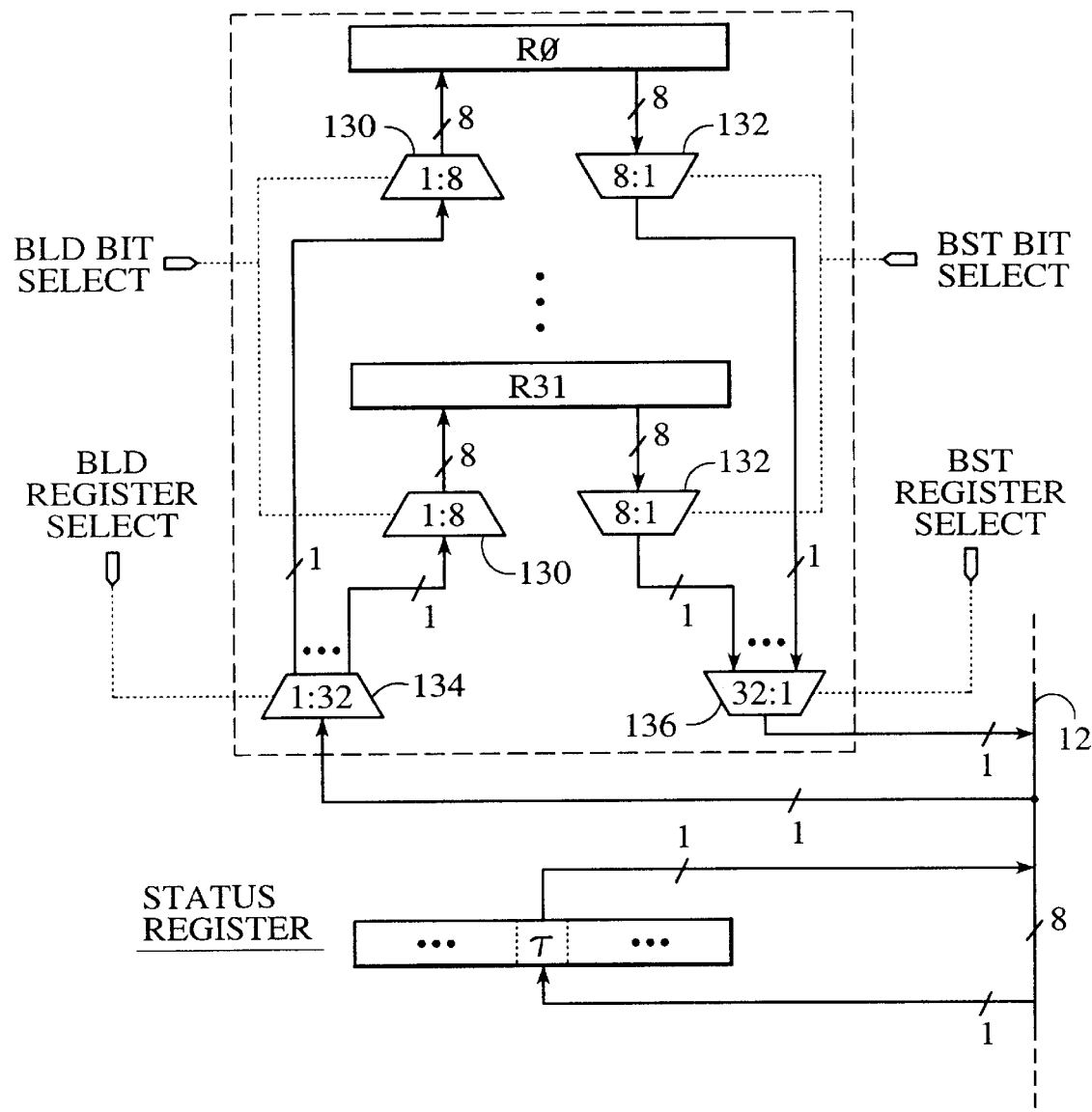
Figure 4B:
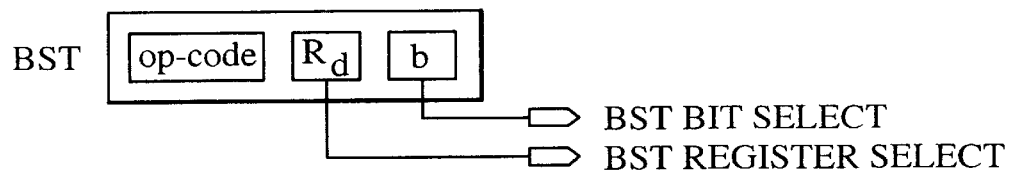
Figure 4B:
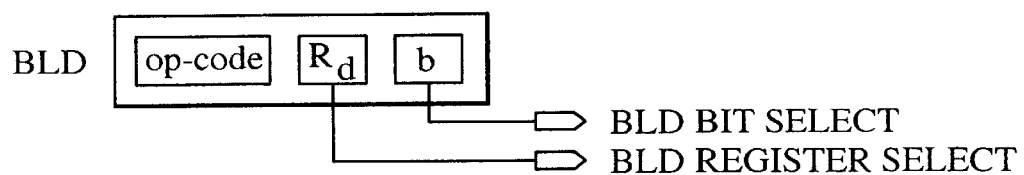

Consider first the bit transfer instructions (BST, BLD) diagrammed in FIG. 4B. Each of the BST and BLD instructions includes an OP_CODE field identifying the specific instruction and two operands: a register operand Rd and a bit position operand b. When these instructions are decoded by the INSTRUCTION DECODER (FIG. 1), a register select control signal and a bit select control signal will be generated. These control signals control the mux's 132–136 to access the desired bit. A BST REGISTER SELECT control signal is produced for the BST instruction based on the register operand Rd. Similarly, a BST BIT SELECT control signal is produced based on the bit position operand b. Similar control signals are produced for the BLD instruction.

As shown in FIG. 4B, the BST BIT SELECT control signal operates the 8:1 mux 132 of each of the registers R0–R31 to transfer the specified bit from each register to the 32:1 mux 136. The BST REGISTER SELECT control signal operates the 32:1 mux to select the specified one of the 32 bits, thus transferring the selected bit of the selected register to the eight bit data bus 12, which is then latched into the T-bit position of the STATUS REGISTER.

The control signals corresponding to the BLD instruction operate mux's 130 and 134 in a similar manner. A bit stored in the T-bit is transferred via the data bus 12 into the 32:1 mux 134. The bit is then transferred to one of the 1:8 mux's 132 under the control of the BLD REGISTER SELECT control signal, sending the bit to the specified register. The BLD BIT SELECT then outputs the bit into the correct bit position of the specified register.

Figure 2B:
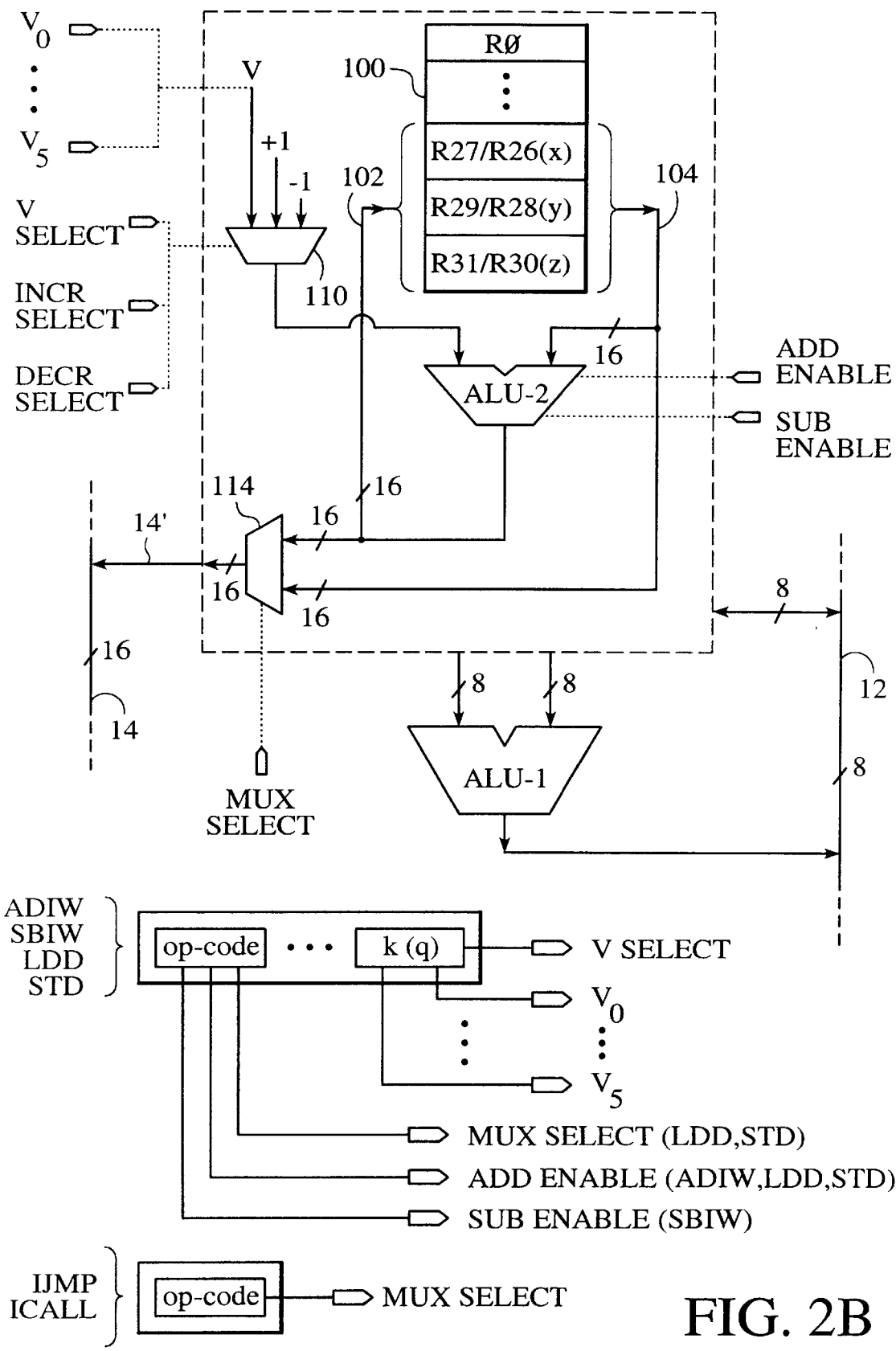

Consider next, the 16 bit arithmetic operations ADIW and SBIW, the addition and subtraction respectively of a constant value with one of the logical 16 bit registers X, Y, Z. Referring first to FIG. 2B, a diagram of the ADIW and SBIW instructions shows that the OP_CODE field and the constant-value operand K produce control signals upon decoding by the INSTRUCTION DECODER (FIG. 1). The OP_CODE field produces either an ADD ENABLE or a SUB ENABLE control signal which causes ALU-2 to perform the appropriate arithmetic operation on its two inputs. The constant-value operand K produces control signals $V_5$–$V_0$ which feed into the V input of the selector 110. The control signals $V_5$–$V_0$ represent in binary form the constant K specified in the operand of the ADIW and SBIW instructions. In the disclosed embodiment of the invention, the constant K is a 6 bit datum. In addition, the constant-value operand K produces a V SELECT control signal which causes the selector 110 to output the constant V to an input of ALU-2. The other input to ALU-2 comes from a selected one of the 16 bit registers X, Y, Z in the REGISTER FILE via the data-out bus 104, as will be explained below. The output of ALU-2 feeds back into the REGISTER FILE via the data-in bus 102 and stored into the selected 16 bit register, thus completing the operation.

Figure 3B:
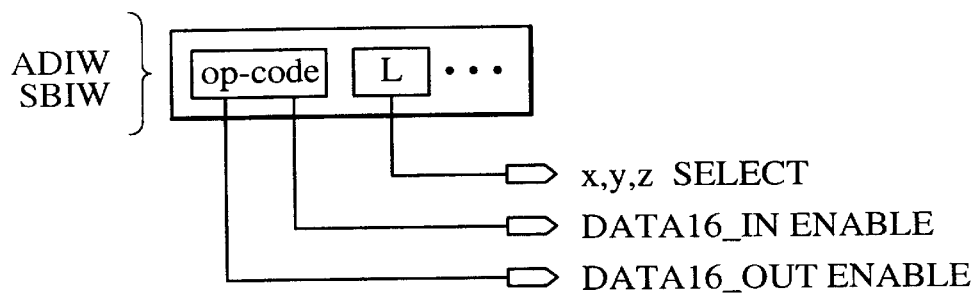
Figure 3B:
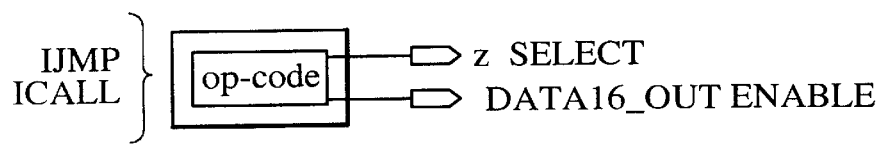
Figure 3B:
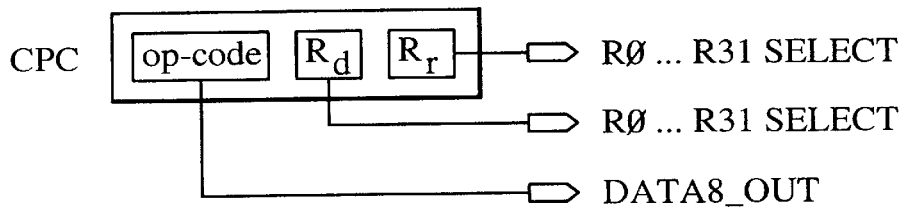
Figure 3B:
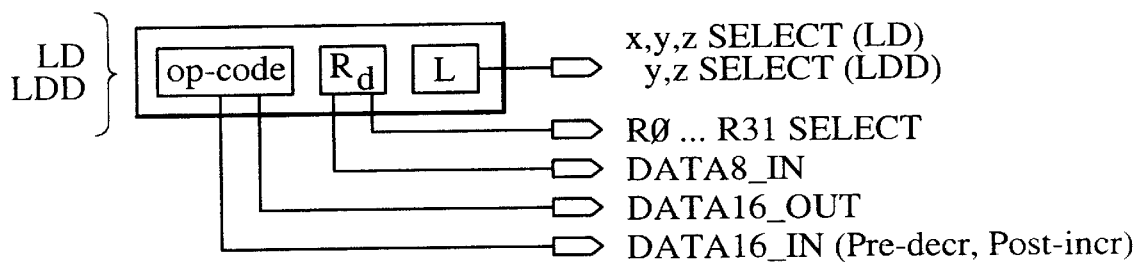
Figure 3B:
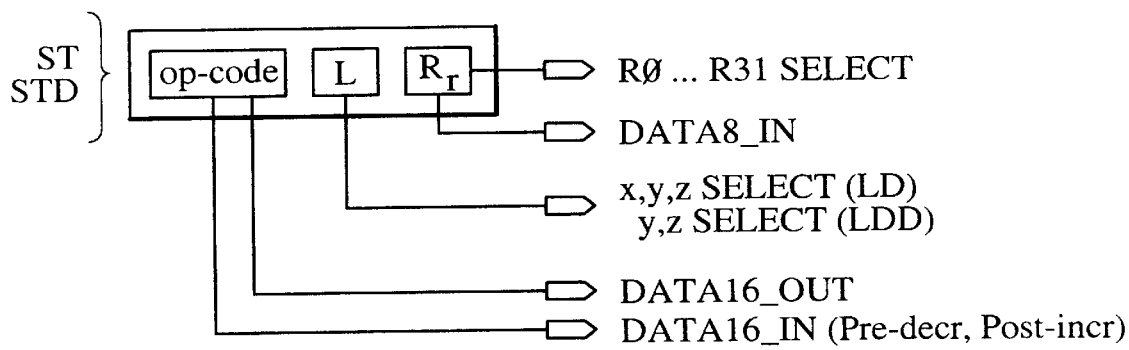

Referring to FIGS. 3A and 3B, consider now the control signals produced by the INSTRUCTION DECODER for the ADIW and SBIW instructions. The register operand L produces an X, Y, or Z SELECT control signal which enables the appropriate register pair to provide read/write access to the specified logical 16 bit register. The X SELECT signal enables registers R26 and R27, the Y SELECT signal enables registers R28 and R29, and the Z SELECT signal enables registers R30 and R31. The OP_CODE field produces the DATA16_IN ENABLE and the DATA16_OUT ENABLE control signals. The DATA16_OUT ENABLE control signal causes the data-out latches 120, 122 to output the data contained in the selected logical 16 bit register onto the data-out bus 104 which feeds into the ALU-2 as described above. Conversely, the DATA16_IN ENABLE control signal causes the data-in latches 124, 126 to input the resulting sum or difference produced at the output of ALU-2.

Figure 2C:
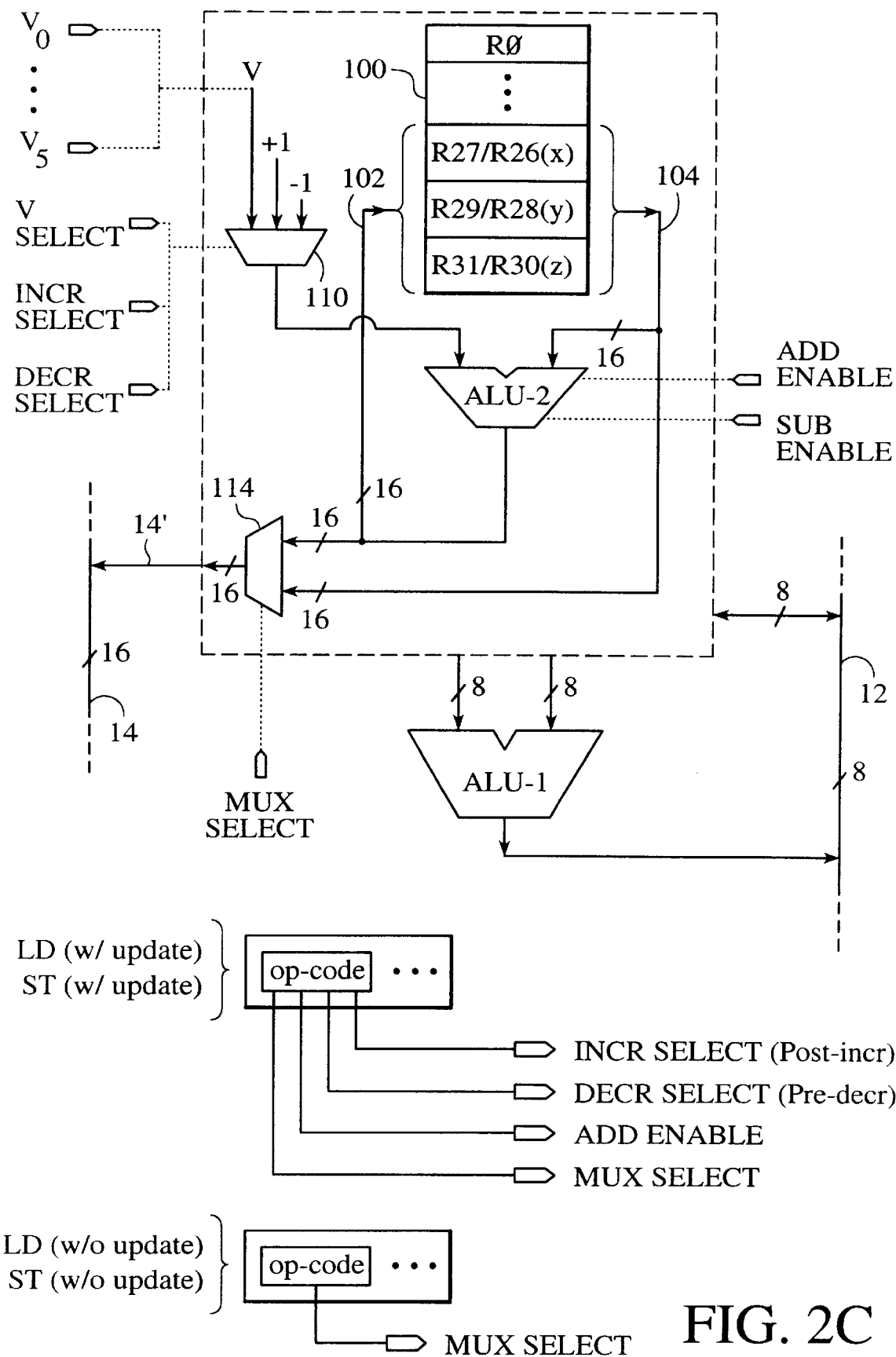

Next are the load and store instructions (LD, ST) which involve the logical 16 bit registers X, Y, Z. Consider first the form of the LD and ST operations in which there is either pre-decrement or post-increment of the 16 bit register. Referring to FIG. 2C, it can be seen that the OP_CODE field for a load/store operation with update generates either a DECR SELECT or an INCR SELECT control signal, depending on whether the update is a pre-decrement or post-increment. The DECR SELECT and INCR SELECT control signals operate the selector 110 to output the appropriate "−1" or "+1" value which is fed into an input of ALU-2. The other input to ALU-2 comes from a selected one of the 16 bit registers X, Y, Z in the REGISTER FILE via the data-out bus 104. The ADD ENABLE signal is generated so that ALU-2 adds the value "−1" or "+1" to the contents of the selected 16 bit register. The MUX SELECT control signal operates the mux 114 to output an address to the bus interface 14' of the REGISTER FILE. The timing of the MUX SELECT control signal varies depending on whether the instruction is pre-decrement or post-increment. If a pre-decrement is desired, the MUX SELECT control signal is produced after ALU-2 performs its operation, so that mux 114 can transfer the output of ALU-2 to the bus interface 14' before the operation by ALU-2. On the other hand, if a post-increment is desired, the MUX SELECT causes the mux 114 to transfer the data-out bus 104 to the bus interface 14'. In both cases, the output of ALU-2 is fed back into the REGISTER FILE via the data-in bus 102 so that the selected 16 bit register can be updated.

Referring now to FIGS. 3A and 3B, it can be seen that the LD and ST instructions with update result in the X, Y, Z SELECT control signals and the DATA16_IN ENABLE and DATA16_OUT ENABLE control signals. These signals function in the same way as for the ADIW and SBIW instructions, since in all cases, the contents of a 16 bit register are being updated. In addition to these control signals, are the R0–R31 SELECT and the DATA8_IN and DATA8_OUT control signals produced as a result of decoding the register operand Rd of the LD and ST instructions. For the load instruction, the DATA8_IN control signal operates the lo-byte data-in latch 126 to latch in the data referenced by the 16 bit register, which is then loaded into the 8 bit register selected by the R0–R31 SELECT control signal. For the store instruction, the DATA8_OUT control signal operates the lo-byte data-out latch 122 to output the contents of the 8 bit register selected by the R0–R31 SELECT control signal, which is then stored into the memory location pointed to by the 16 bit register.

Consider next the form of the LD and ST instructions without update, i.e. without a pre-decrement or a post-increment operation. With respect to FIG. 2C, since there is no updating of the selected 16 bit register, only the MUX SELECT control signal is needed in order to transfer the 16 bit register (via data-out bus 104) onto the indirect-address bus 14. With respect to FIG. 3B, the same control signals are produced as for the LD and ST instructions with update, except that the DATA16_IN ENABLE signal is not needed since no update of the 16 bit register occurs.

A third form of the load and store operations utilizes a displacement q that is added to the selected 16 bit register.

These are the LDD and STD instructions. As can be seen in FIG. 2B, the LDD and STD instructions operate in a manner very similar to the ADIW and SBIW instructions. The displacement value q is represented by the control signals $V_5$–$V_0$. The ADD ENABLE control signal causes ALU-2 to add the displacement to the selected 16 bit register. However, unlike ADIW and SBIW, the LDD and STD instructions produce the MUX SELECT signal which allows the computed value to be output to the indirect-address bus 14 as an address. Turning to FIGS. 3A and 3B, the LDD and STD instructions produce essentially the same control signals as the LD and ST instructions, with two exceptions: DATA16_IN ENABLE is not generated since no update of the 16 bit register occurs; and the LDD and STD instructions are limited to the Y and Z registers.

The jump instructions IJMP, ICALL as shown in FIG. 3B, simply involve the selection of the Z register and generating the DATA16_OUT ENABLE control signal to output the contents of the Z register onto the indirect-address bus 14. In FIG. 2B, the IJMP and ICALL instructions generate the MUX_SELECT control signal to operate the mux 114 so that the contents of the Z register can be transferred from the data-out bus 104 of the REGISTER FILE to the address bus 14. The address is then loaded into the PC COUNTER to change the flow of execution control.

The compare-with-carry CPC instruction shown in FIG. 3B simply involves the generation of one of the R0–R31 SELECT control signals for each of the register operands Rd, Rr of the instruction. The DATA8_OUT control signal outputs the contents of the selected 8 bit registers.

Additional control signals (not shown) are generated which cause the 8 bit ALU-1 to subtract the sum of the contents of the Rr register and the carry bit from the contents of the Rd register. The result of the operation is not saved; however, the flags in the status register are set according to the result of the operation.

The CPC instruction enhances the 8 bit architecture of the microprocessor by providing 16 bit capability in an 8 bit environment. The carry result from an 8 bit operation can be used in a subsequent 8 bit CPC operation to produce a 16 bit effect. For example, a 16 bit compare can be implemented as follows:

```
        :
        :
    ; compare a 16 bit "value" contained in registers R3 and R2
    ; to a 16 bit "value" contained in registers R1 and R0
    ;
    cp  r2, r0    ; compare low bytes
    cpc r3, r1    ; compare high bytes
    brne LABEL    ; branch if not equal
        :
        :
LABEL:  :
        :
```

The "cp" instruction will affect the carry bit which is then used in the subsequent "cpc" instruction. The register pairs R3/R2 and R1/R0 effectively serve as holders for two 16 bit values.

This concludes the discussion of the control signals relevant to the instructions and logic circuits disclosed with respect to the microcontroller of the present invention. It is understood that these signals are not the only control signals involved in the execution of the above instructions. Additional signals are produced to control other elements of the microcontroller. For example, address and read/write strobes are generated for those of the above instructions involving memory access. In addition, execution timing control is required to properly synchronize the issuance of the control signals. However, a person of ordinary skill in the art of integrated computer circuits is capable of determining, without undue experimentation, the required additional control signals and the necessary timing of such signals to practice the invention.

We claim:

1. A microcontroller having a Harvard architecture, comprising:

a program bus;

a program memory store for storing programs;

an instruction decoder unit coupled to said program store via said program bus;

an eight-bit data bus separate from said program bus;

randomly accessible memory separate from said program store coupled to said eight-bit data bus;

a register file coupled to said eight-bit data bus, said register file having a plurality of eight-bit registers, said register file further having means for combining two of said eight-bit registers to be accessed as a single logical sixteen-bit register;

a general purpose ALU coupled to receive the contents of two of said eight-bit registers, said general purpose ALU having an output coupled to said eight-bit data bus;

a direct-address bus coupling said program execution unit to directly access said data store and said register file during program execution; and an indirect-address bus providing said register file with indirect data access to said randomly accessible memory during program execution;

said register file further including a dedicated ALU coupled to said means for combining in order to perform arithmetic functions on a logical sixteen-bit register accessed through said combining means;

said indirect-address bus having address-receiving means for receiving a sixteen-bit value from said combining means, thereby providing sixteen-bit indirect addressing.

2. The microcontroller of claim 1 wherein said register file further includes a selector means for outputting a numeric constant of −1, a numeric constant of +1, or a program-generated value, said dedicated ALU being coupled to receive output from said selector means in order to perform arithmetic with a logical sixteen-bit register accessed through said combining means.

3. The microcontroller of claim 2 wherein one of said two eight-bit registers is the low byte of said logical sixteen-bit register and the other of said two eight-bit registers is the high byte of said logical sixteen-bit register.

4. The microcontroller of claim 1 further including a paging register and address-forming means, coupled to said address-receiving means, for forming an address from the contents of said paging register and a sixteen-bit address provided by said combining means.

5. The microcontroller of claim 4 wherein said paging register is an eight-bit register, said paging register being coupled to said eight-bit data bus, whereby loading a value into said paging register specifies one of 256 pages of 64K bytes each.

6. The microcontroller of claim 1 further including a bit store for holding a single bit and means for transferring a bit between said bit store and a bit location in a register selected from said register file.

7. The microcontroller of claim 6 further including a status register coupled to said eight-bit data bus, said status register having a plurality of bit positions, one of which serves as said bit store.

8. In an eight-bit microcontroller having a program bus, a program store, a program execution unit coupled to said program store via said program bus, an eight-bit data bus, a data store separate from said program store coupled to said data bus, a general purpose eight-bit ALU having an output coupled to said data bus, and a first address bus coupling said program execution unit to said data store, the improvement comprising:

a register file having a plurality of eight-bit registers accessible by said general purpose eight-bit ALU to provide eight-bit arithmetic on two of said eight-bit registers, said register file further having register means for providing access to two of said registers as a sixteen-bit register, said register file further having a sixteen-bit ALU and a value selector, said sixteen-bit ALU being coupled to receive a sixteen-bit datum from said register means and to receive a numeric value from said value selector to perform a computation therewith; and a second address bus for receiving the result of a computation from said sixteen-bit ALU, said second address bus being coupled between said register file and said data store, the result of said computation being used as an address of a memory location in said data store.

9. The eight-bit microcontroller of claim 8 wherein said value selector provides a numeric constant of −1, a numeric constant of +1, or a program-generated numeric value.

10. The eight-bit microcontroller of claim 9 wherein said register file includes means for transferring either the result of said computation of said sixteen-bit ALU or a sixteen-bit datum from said register means to said second address bus.

11. The eight-bit microcontroller of claim 10 further including a paging register and means for forming an extended address based on the contents of said paging register and a sixteen-bit address provided from said register means.

12. The eight-bit microcontroller of claim 11 further including an external address bus and means for selectively coupling said extended address to said external address bus and to said second address bus.

13. The eight-bit microcontroller of claim 12 wherein said paging register is an eight-bit register.

14. The eight-bit microcontroller of claim 12 further including a bit store and means for transferring a one-bit datum between said bit store and a bit location in a register of said register file.

15. The eight-bit microcontroller of claim 14 further including a status register coupled to said eight-bit data bus, said bit store being a bit location in said status register.

16. An eight-bit microcontroller having a Harvard-based architecture, comprising:

a program instruction decoder for decoding program instructions thereby generating control signals;

a randomly accessible memory;

a register file having a plurality of eight-bit registers, register means for accessing two of said eight-bit registers as a logical single sixteen-bit register, a numeric value selector for outputting either a "+1" value or a "−1" value, and a sixteen-bit adder for adding the output of said numeric value selector to said logical single sixteen-bit register;

an eight-bit ALU coupled to receive the contents of two of said eight-bit registers for arithmetic operations thereon;

a status register having a transfer bit for receiving a bit from one of said eight-bit registers and for copying a bit to one of said eight-bit registers;

a bit transfer means for transferring a bit between one of said eight-bit registers and said transfer bit of said status register;

an eight-bit data bus coupling together said data store, said register file, said eight-bit ALU, said status register, and said bit transfer means;

an address bus coupling said register file to said randomly accessible memory to access memory locations therein; and control lines for carrying said control signals to said register file, said eight-bit ALU, said status register, and said bit transfer means.

17. The microcontroller of claim 16 including a first subset of program instructions each having a numeric opcode specifying an increment or a decrement code and a register-pair opcode specifying one of a pair of said eight-bit registers, wherein said instruction decoder is characterized by generating first control signals in response to said register-pair opcode and said numeric opcode which cause: said register means to access said pair of registers as a sixteen-bit register; said numeric value selector to output a "+1" or a "−1"; and said sixteen-bit adder to add said output of said selector to said sixteen-bit register.

18. The microcontroller of claim 17 wherein said numeric value selector includes means for receiving a numeric constant and for outputting said numeric constant, some of said first subset of program instructions having numeric opcodes which specify a numeric value, wherein said instruction decoder is further characterized by generating second control signals in response to those of said numeric opcodes which specify a numeric value, said second control signals being a binary representation of said numeric value which are received by said numeric value selector.

19. The microcontroller of claim 18 further including a second subset of program instructions each having a register opcode identifying a register in said register file and a bit opcode specifying a bit position of the register identified by said register opcode, wherein said instruction decoder is further characterized by generating third control signals in response to said register opcode and said bit opcode which cause said bit transfer means to transfer a bit between said transfer bit of said status register and the bit position designated by said register opcode and by said bit opcode.

20. The microcontroller of claim 19 further including a program instruction having a destination register opcode and a source register opcode, each specifying one of said eight-bit registers, said status register further including a carry bit, said eight-bit ALU being coupled to receive said carry bit, wherein said instruction decoder is further characterized by generating a fourth set of control signals in response to said destination and said source register opcodes which cause said eight-bit ALU to perform the following arithmetic computation:

$$Rd - Rr - C,$$

where Rd and Rr are the contents of registers respectively identified by said destination register opcode and said source register opcode, and C is the content of said carry bit.

* * * * *

UNITED STATES PATENT AND TRADEMARK OFFICE
CERTIFICATE OF CORRECTION

PATENT NO. : 5,854,939
DATED : December 29, 1998
INVENTOR(S) : Vegard Wollan et al.

It is certified that error appears in the above-identified patent and that said Letters Patent is hereby corrected as shown below:

Column 16,
Line 28, "said program execution unit" should read -- said instruction decoder unit --.

Signed and Sealed this

Eighth Day of June, 2004

JON W. DUDAS
*Acting Director of the United States Patent and Trademark Office*